United States Patent
Drott et al.

(10) Patent No.: US 6,851,767 B2
(45) Date of Patent: Feb. 8, 2005

(54) ACTUATOR FOR AN ELECTROHYDRAULIC BRAKING SYSTEM

(75) Inventors: Peter Drott, Frankfurt am Main (DE); Horst Krämer, Ginsheim-Gustavsburg (DE); Holger Kranlich, Karben (DE); Jan Hoffmann, Rochester Hills, MI (US)

(73) Assignee: Continental Teves AG & Co., OHG, Frankfurt (DE)

( * ) Notice: Subject to any disclaimer, the term of this patent is extended or adjusted under 35 U.S.C. 154(b) by 22 days.

(21) Appl. No.: 10/363,525

(22) PCT Filed: Aug. 31, 2001

(86) PCT No.: PCT/EP01/10085
§ 371 (c)(1),
(2), (4) Date: Aug. 6, 2003

(87) PCT Pub. No.: WO02/20323
PCT Pub. Date: Mar. 14, 2002

(65) Prior Publication Data
US 2004/0095017 A1 May 20, 2004

(30) Foreign Application Priority Data
Sep. 5, 2000 (DE) .......................................... 100 43 988

(51) Int. Cl.⁷ .............................................. B60T 8/60
(52) U.S. Cl. .................................... 303/155; 303/113.4
(58) Field of Search .......................... 303/113.4, 115.2, 303/3, 20, 115.1, 114.1, 155; 60/534, 545

(56) References Cited

U.S. PATENT DOCUMENTS 6,007,161 A * 12/1999 Worsdorfer .............. 303/115.2
6,033,035 A * 3/2000 Neumann et al. ........ 303/113.4
6,361,122 B2 * 3/2002 Anderson et al. .............. 303/3
6,574,959 B2 * 6/2003 Fulks et al. ..................... 60/545
6,588,855 B2 * 7/2003 Harris .......................... 303/20
6,619,039 B2 * 9/2003 Zehnder et al. ............... 60/534

FOREIGN PATENT DOCUMENTS

| | | |
|---|---|---|
| DE | 3413430 | 10/1985 |
| DE | 19546647 | 6/1997 |
| DE | 19622545 | 12/1997 |
| DE | 19632035 | 2/1998 |
| DE | 19718533 | 11/1998 |
| DE | 19748182 | 5/1999 |
| DE | 19915832 | 7/2000 |
| DE | 19929154 | 12/2000 |
| DE | 19929875 | 1/2001 |
| DE | 19929877 | 1/2001 |
| EP | 0200401 | 11/1986 |

* cited by examiner

Primary Examiner—Robert A. Siconolfi
Assistant Examiner—Melanie Torres
(74) Attorney, Agent, or Firm—Honigman, Miller, Schwartz and Cohn LLP

(57) ABSTRACT

The present invention relates to an actuator for an electrohydraulic braking system of the 'brake-by-wire' type comprised of a hydraulic pressure generator or master brake cylinder and a travel simulator, with said master brake cylinder including at least one piston that is operable by an actuating pedal, and wherein a device for detecting a driver's deceleration wish is provided, said device cooperating with said piston and being at least partly arranged in a master brake cylinder housing. To optimize the assembly in terms of packaging, production costs, weight, and function, the present invention discloses that the device for detecting a driver's deceleration wish comprises an annular housing embracing the piston in a radial direction and accommodating signal receiving elements which cooperate with signal transmitting elements mounted on the piston surface.

13 Claims, 2 Drawing Sheets

US 6,851,767 B2

ACTUATOR FOR AN ELECTROHYDRAULIC BRAKING SYSTEM

TECHNICAL FIELD

The present invention generally relates to an actuator for an electro-hydraulic braking system and more particularly relates to an actuator for an electro-hydraulic, 'brake-by-wire' braking system.

BACKGROUND OF THE INVENTION

An actuating unit of this type is generally disclosed in patent application DE 199 29 154.3. The special features of the prior-art actuating unit consist in that the travel simulator is provided by a resetting spring biasing the piston in opposition to the direction of actuation, and there is a valve device which closes or opens a hydraulic connection between the pressure chamber bounded by the piston and a non-pressurized pressure fluid supply reservoir. The mentioned publication, however, does not provide a system for detecting a driver's deceleration wish.

BRIEF SUMMARY OF THE INVENTION

In view of the above, an object of the present invention is to disclose for an actuator of the type mentioned hereinabove a device for detecting a driver's deceleration wish, with said device being optimized with respect to packaging, production costs, weight and function.

This object is achieved by the present invention which comprises an annular housing embracing the piston in a radial direction and accommodating signal receiving elements which cooperate with signal transmitting elements mounted on the piston surface.

A favorable aspect of the present invention implies that the piston is guided in the housing.

In another favorable embodiment of the subject matter of the invention, the annular housing is axially preloaded in relation to the master brake cylinder housing.

DETAILED DESCRIPTION OF THE PREFERRED EMBODIMENTS

Figure 1:
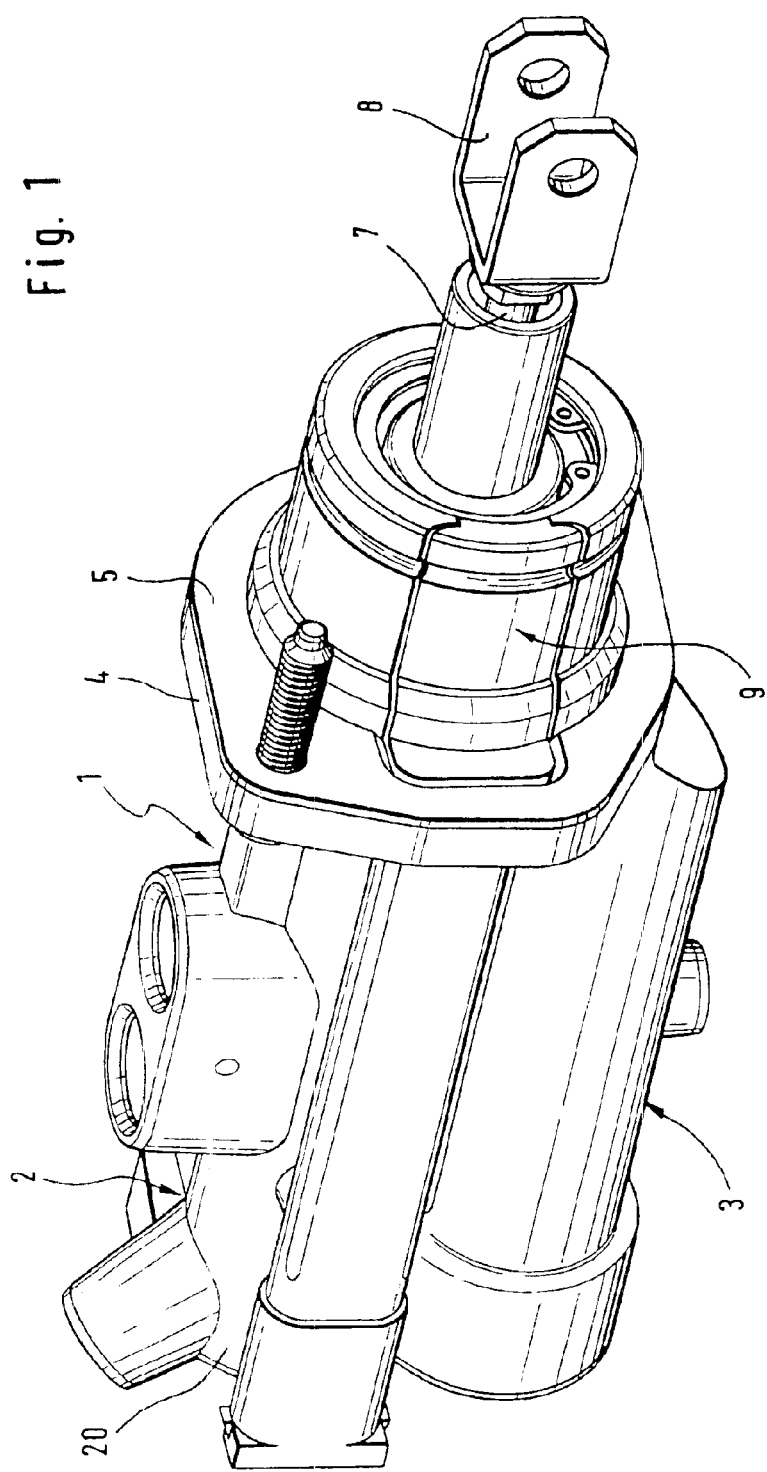
FIG. 1 is a perspective view of a design of the actuator of the present invention.

The actuator 1 for an electro-hydraulic brake system of the 'brake-by-wire' type, as shown in the drawing, includes a dual-circuit pressure generator or master brake cylinder 2, a travel simulator 3, and an non-pressurized pressure fluid supply reservoir (not shown) associated with the master brake cylinder 2. The master brake cylinder housing 20 includes a radial flange 4 that is used to attach the actuator 1 to a body wall (not shown) of a motor vehicle. The attachment in the vehicle is preferably carried out in such a way that the parts of the actuator arranged on the right side of flange 4 in FIG. 1 extend into the passenger compartment, while the parts arranged on the left are arranged in the engine compartment of the motor vehicle. A flat seal 5 is used to seal the flange 4 in relation to the vehicle body wall. A hydraulic master cylinder piston 6 (FIG. 2) is operated by a piston rod 7 coupled to an actuating or brake pedal (not shown) by means of a yoke 8. The actuating movement of the piston rod 7 or of the master cylinder piston 6 is sensed by means of a device for detecting a driver's deceleration wish, being designated by reference numeral 9.

Figure 2:
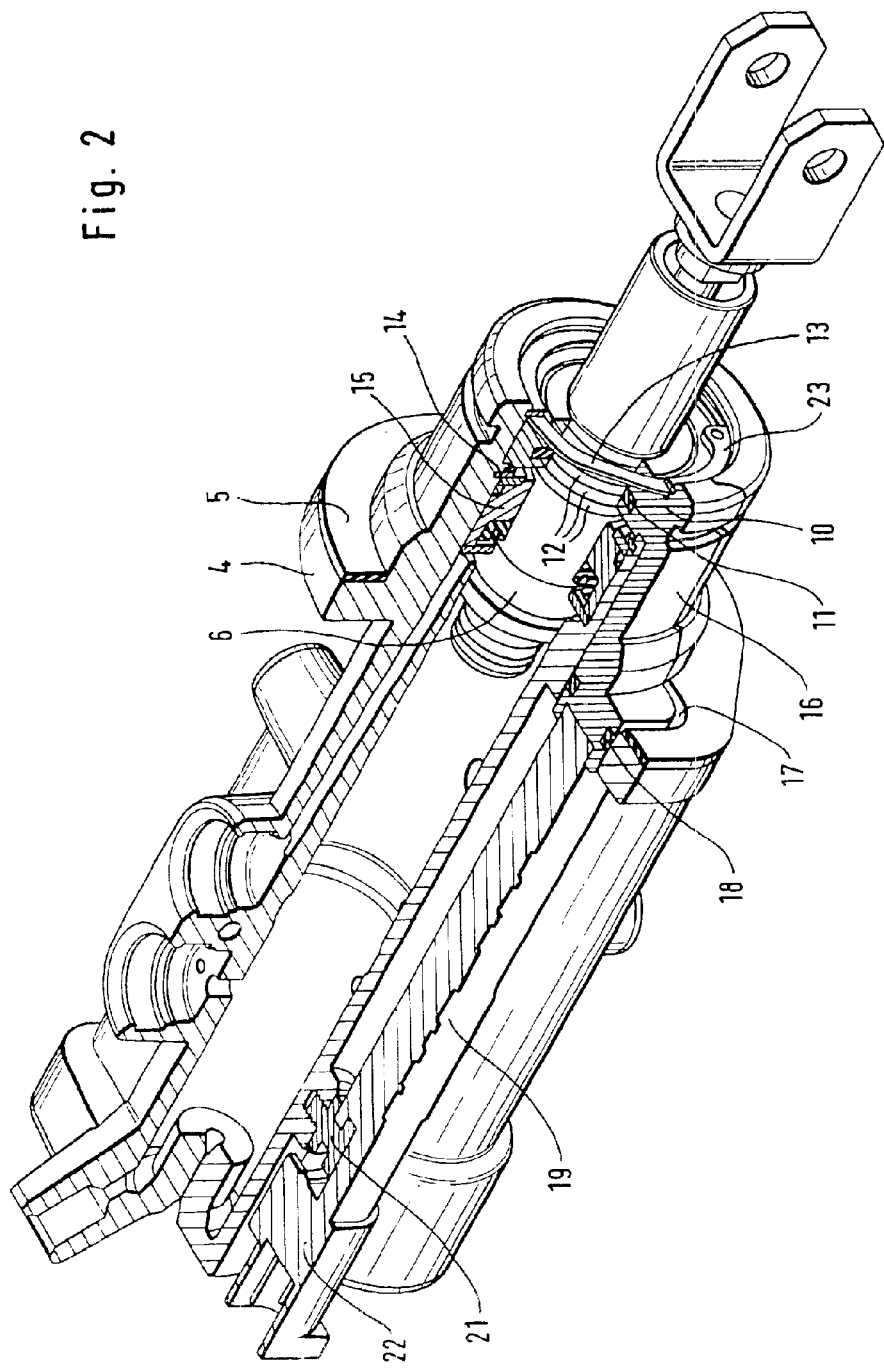
FIG. 2 is a perspective cross-sectional view of the actuator of the present invention as shown in FIG. 1.

As can be seen in FIG. 2 in particular, the device 9 for detecting a driver's deceleration wish includes an annular housing 10 that embraces the above-mentioned piston 6 in a radial direction or, respectively, in which said piston 6 is guided. Disposed in annular housing 10 are signal receiving elements 11 which, along with signal transmitting elements 12 fitted to the piston surface, form a measurement system. The annular housing 10 is axially supported, preferably under the preload of a spring 13, on a stop 14 on the master cylinder housing against which, in turn, a packing 15 bears that is used to seal the master brake cylinder 2 with respect to the atmosphere. However, a design wherein the packing 15 is formed integrally with the annular housing 10 is also feasible. The annular housing 10 is secured in position in the master brake cylinder housing 20 by means of a retaining ring 23 on which the above-mentioned spring 13 is supported.

As is apparent from FIG. 2, the housing 10 includes a first cable guide part 16 extending through an opening 17 provided in flange 4 and being sealed in relation to flange 4 by means of a seal 18 that preferably acts in a radial direction. This prevents the ingress of fluid into the passenger compartment. The first cable guide part 16 is preferably configured so that its contour is adapted to the contour of the section of the master brake cylinder housing 20 that projects into the passenger compartment so that it is e.g. able to also fulfill centering tasks in this area.

Adjacent to the first cable guide part 16 is a second cable guide part 19 that extends substantially in parallel to the master cylinder housing 20 and is attached thereto by means of a fastening element 21. An electric interface or an electric connector part 22, respectively, is arranged at the end of the second cable guide part 19, especially in the area of its attachment to the master cylinder housing 20. Of course, also a design is possible where the electric connector part is directly connected to the first cable guide part 16. A favorable design arranges for the annular housing 10, both cable guide parts 16, 19, and the electric connector part 22 to be made of plastics and to have an integral design. Additionally a modification (not shown) is possible wherein a sealing element in the type of a pleated bellows is provided between the master brake cylinder housing 20 and the piston rod 7. It is particularly expedient in this variant when the above-mentioned flat seal 5 is designed integrally with the sealing element.

What is claimed is:

1. Actuator for an electro-hydraulic braking system of the 'brake-by-wire' type, comprising:

a hydraulic pressure generator having a working piston, a device for detecting a driver's deceleration wish wherein said device cooperates with said piston and wherein said device is at least partly arranged in a housing of said hydraulic pressure generator, wherein the device for detecting a driver's deceleration wish further includes a portion which adjoins an outer surface of the piston, wherein said device includes signal receiving elements which cooperate with said piston for detecting the position or movement of the piston, wherein the device housing includes a first cable guide part extending through a flange of said hydraulic pressure generator, wherein said hydraulic pressure generator flange is used to attach the hydraulic pressure generator to a vehicle wall, wherein the housing of the hydraulic pressure generator includes said flange, wherein said flange is sealed in relation to the vehicle wall by means of a flat seal.

2. Actuator as claimed in claim 1, herein the piston is at least partially guided in a housing of said device.

3. Actuator as claimed in claim 1, wherein the device housing is a partial annulus and it is preloaded along an axis of said piston.

4. Actuator as claimed in claim 1, wherein the first cable guide part extends through an opening in said flange and is sealed to the flange.

5. Actuator as claimed in claim 4, wherein the first cable guide part is shaped so that a portion of its contour corresponds to a portion of, and is cooperatively received in the contour of the hydraulic pressure generator housing that extends into a passenger compartment of a motor vehicle.

6. Actuator as claimed in claim 1, further including an electric connector part provided at an end of the first cable guide part.

7. Actuator as claimed in claim 6, further including a second cable guide part interposed between the first cable guide part and the connector part is a second cable guide part that extends in parallel to the hydraulic pressure generator.

8. Actuator as claimed in claim 7, wherein the second cable guide part is attached to the hydraulic pressure generator near the connector part.

9. Actuator as claimed in claim 8, wherein the hydraulic pressure generator, the first cable guide part, the second cable guide part, and the connector part have an integral design.

10. Actuator as claimed in claim 8, wherein a housing of the first cable guide part, the second cable guide part, and the connector part are made of plastic material.

11. Actuator as claimed in claim 1, wherein the device includes a housing, and wherein said device housing is arranged completely within the housing of the hydraulic pressure generator, wherein a first and the second cable guide part are at least partially arranged outside the housing of the hydraulic pressure generator.

12. Actuator as claimed in claim 1, wherein the piston is sealed in relation to the housing of the hydraulic pressure generator by means of a packing, wherein the packaging is integrally designed with the annular housing.

13. Actuator as claimed in claim 1, wherein the working piston is operable by means of a piston rod coupled to a brake pedal and wherein a sealing element is provided between the piston rod and the housing of the hydraulic pressure generator, wherein the flat seal is integrally designed with the sealing element.

* * * * *

UNITED STATES PATENT AND TRADEMARK OFFICE
CERTIFICATE OF CORRECTION

PATENT NO. : 6,851,767 B2
DATED : February 8, 2005
INVENTOR(S) : Drott et al.

It is certified that error appears in the above-identified patent and that said Letters Patent is hereby corrected as shown below:

Column 3,
Line 4, change "in claim 1, herein" to -- in claim 1, wherein --.

Signed and Sealed this

Twenty-fourth Day of May, 2005

JON W. DUDAS
*Director of the United States Patent and Trademark Office*